Jan. 6, 1931.　　S. BARDAXOGLOU　　1,788,042
PUNCTUREPROOF RESILIENT TIRE
Filed Dec. 14, 1929

INVENTOR.
Stanley Bardaxoglou
BY
ATTORNEYS.

Patented Jan. 6, 1931

1,788,042

UNITED STATES PATENT OFFICE

STANLEY BARDAXOGLOU, OF BROOKLYN, NEW YORK

PUNCTUREPROOF RESILIENT TIRE

Application filed December 14, 1929. Serial No. 414,098.

This invention relates to improvements in tires for automobiles and similar vehicles, and it is the principal object of my invention to provide a puncture proof resilient tire which does entirely away with the inner pneumatic air tube liable to be punctured and to cause flat tires troublesome to repair and causing annoyance and delay to the automobilists.

My invention does away with these disadvantages by producing a simple and comparatively inexpensive tire which cannot be punctured, yet possesses a resiliency equal to if not superior to the pneumatic tires now commonly used.

Another object of my invention is the provision of a tire protected against punctures by metal rings, which are in turn protected by layers or bands of hair wool or similar substances embedded in rubber and kept in place by a wooden supporting ring, allowing a certain limited movement of the bodies to preserve and impart resiliency to the tire so that it may safely be employed with any loads and all sizes and types of vehicles.

These and other objects and advantages of my invention will become more fully known as the description thereof proceeds, and will then be specifically defined in the appended claims.

In the accompanying drawing forming a material part of this disclosure:

Figure 1:
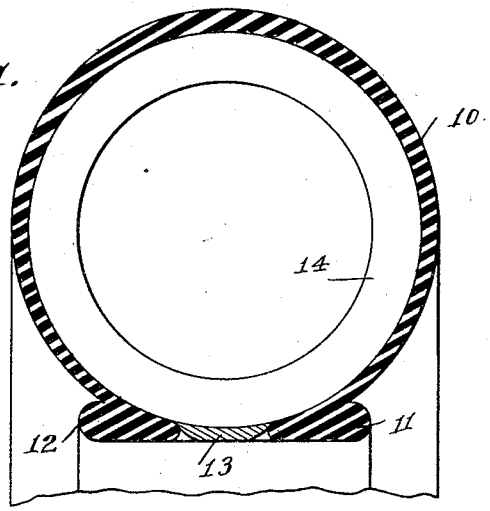
Fig. 1 is a transverse sectional view of a tire shoe constructed in accordance with my invention.
Figure 2:
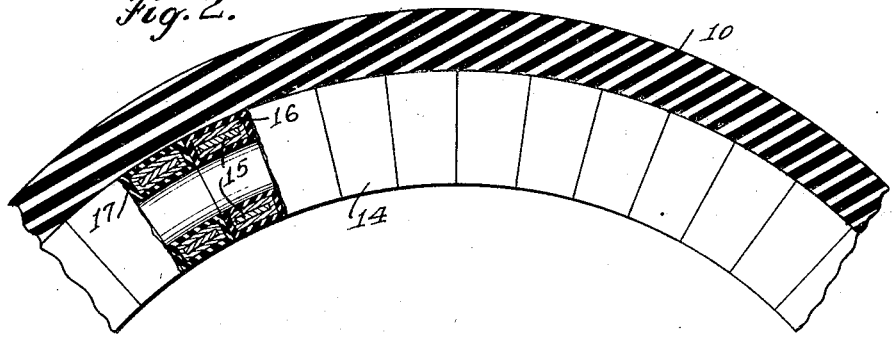
Fig. 2 is a fragmentary longitudinal sectional view of the same.
Figure 3:
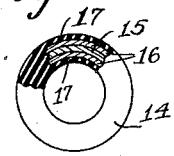
Fig. 3 is a detail end elevation of a filler for the tire, partly broken away to show the interior construction.

As illustrated, the outer shoe 10 of a tire constructed from any suitable material preferably rubber has formed therewith the usual beads 11 and 12 whereby the tire or shoe may be clamped to the rim of a wheel, formed with a wooden supporting ring 13.

The space between shoe and supporting ring is filled by a plurality of substantially wedge shaped bodies 14 substantially circular in cross-section, and each composed of a metal or steel ring 15, forming the core, about which a layer 16 of hair or the like material is wound, and ring and hair layer are embedded in a rubber body 17.

It will be clear that a tire constructed according to my invention will be able to carry the heaviest loads without danger of collapsing and that it cannot be punctured on account of the steel ring protector, while it will have all of the resiliency now obtained from pneumatic tires and will obviate all expense caused by punctures and blow-outs, while it may be readily applied to the wheels of any automobile now in use.

It will be understood that I have shown and described the preferred form of my puncture proof, resilient tire as one example only of the many possible ways to practically construct the same, and that I may make such changes in the construction of the minor details and in the general arrangement of my tire as come within the scope of the appended claims, without departure from the spirit of my invention and the principles involved.

Having thus described my invention, what I claim as new, and desire to secure by Letters Patent is:

1. In a device of the character described, a filler consisting of steel rings, bands of hair or wool wound about said rings, and bands of rubber covering said steel rings and their hair covering.

2. A filler for vehicle wheel tires comprising a plurality of substantially wedge shaped bodies substantially circular in cross-section adapted to be inserted into the tire, each of said bodies composed of a metal ring to form the core of said body, a layer of hair wound about said core, and a rubber body in which ring and hair layer are embedded.

Signed at New York, in the county of New York and State of New York, this 12th day of December, A. D. 1929.

STANLEY BARDAXOGLOU.